Aug. 2, 1966  H. E. HANDLEY  3,263,302
METHOD OF MAKING A TAPERED STRUCTURAL MEMBER
Original Filed March 23, 1961  3 Sheets-Sheet 3
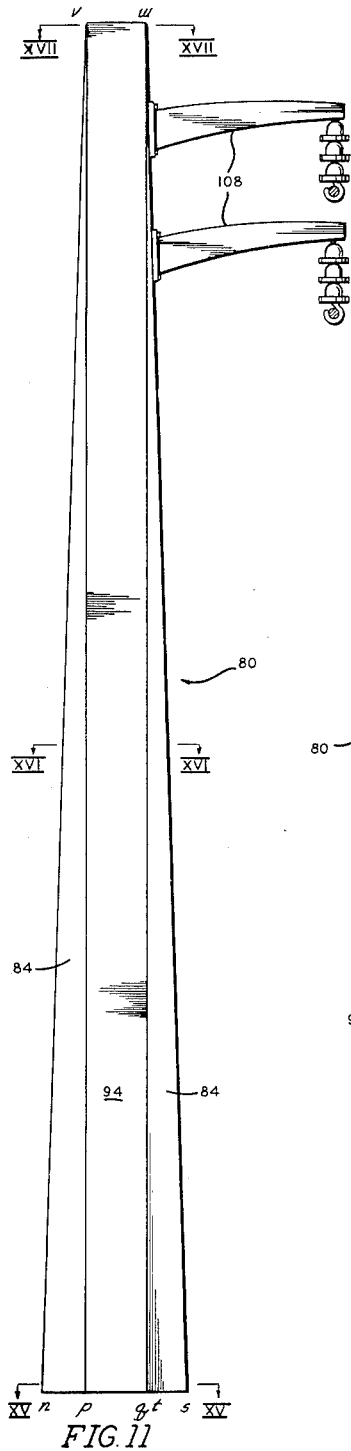
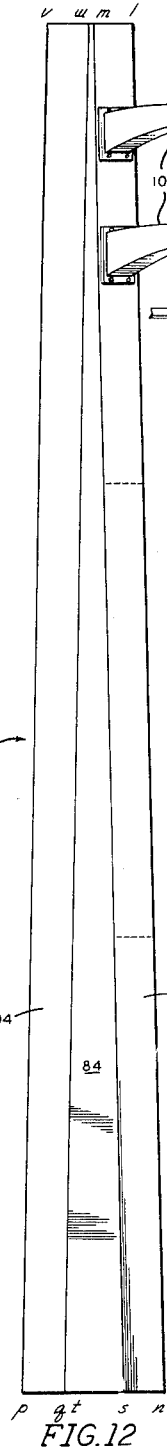
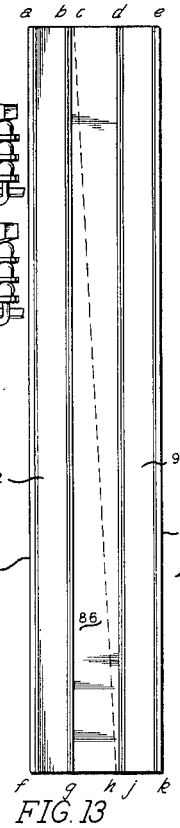
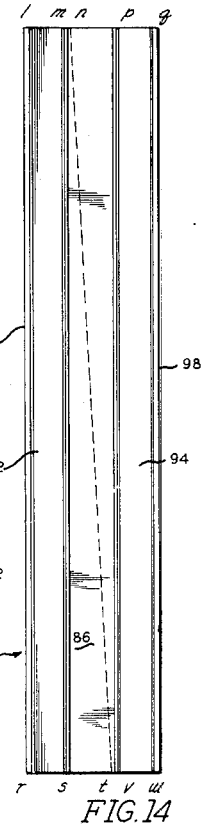
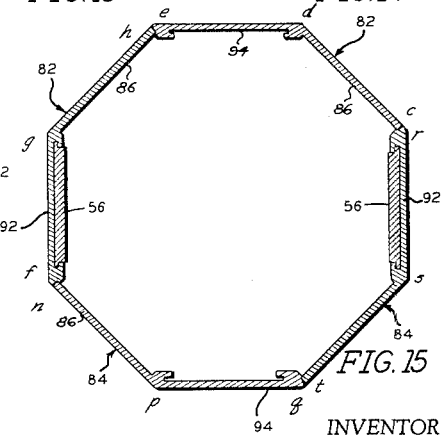
INVENTOR
*HAROLD E. HANDLEY*
BY *Beaman & Beaman*
ATTORNEY

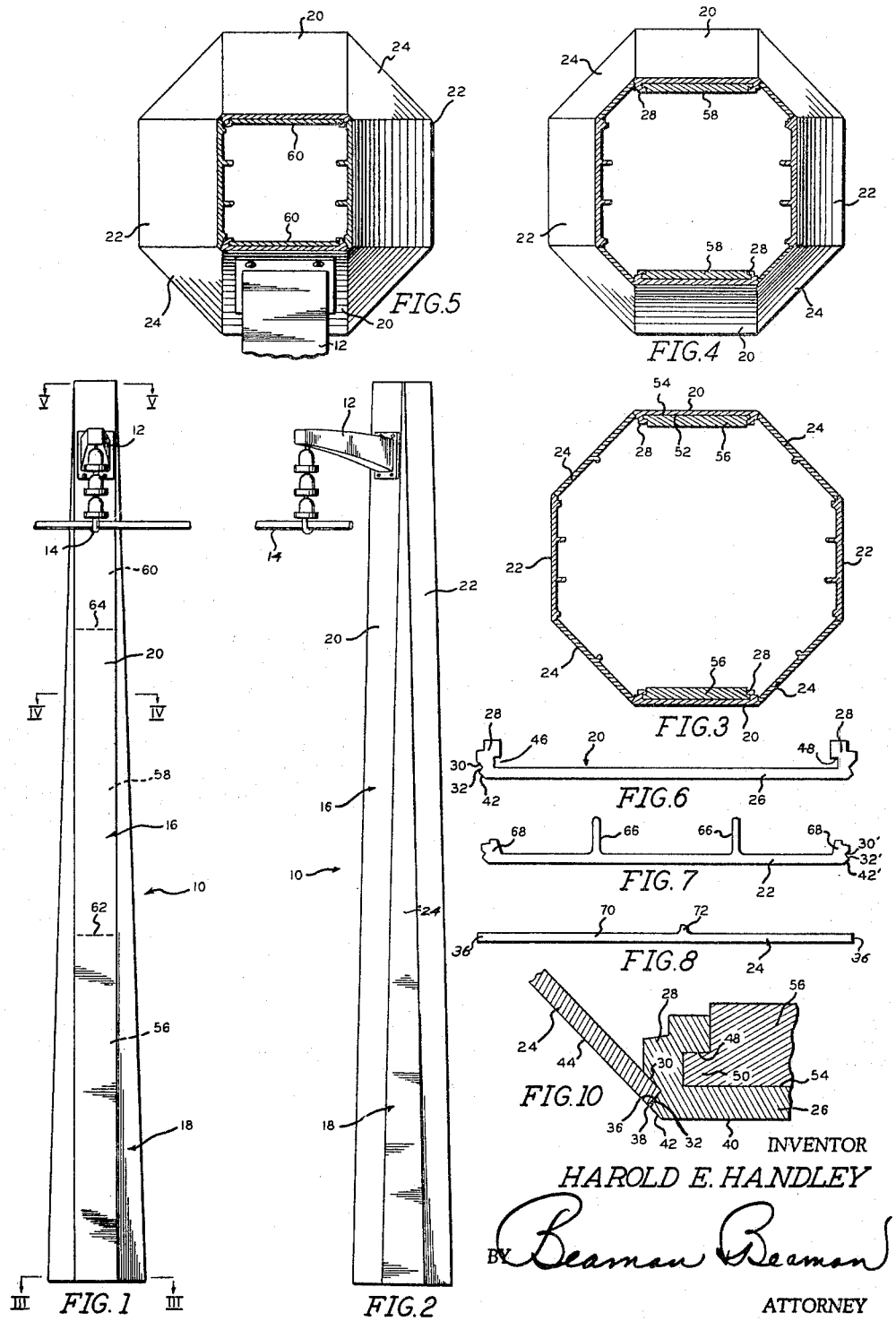
Aug. 2, 1966     H. E. HANDLEY     3,263,302
METHOD OF MAKING A TAPERED STRUCTURAL MEMBER
Original Filed March 23, 1961     3 Sheets-Sheet 1
INVENTOR
HAROLD E. HANDLEY
BY Beaman Beaman
ATTORNEY

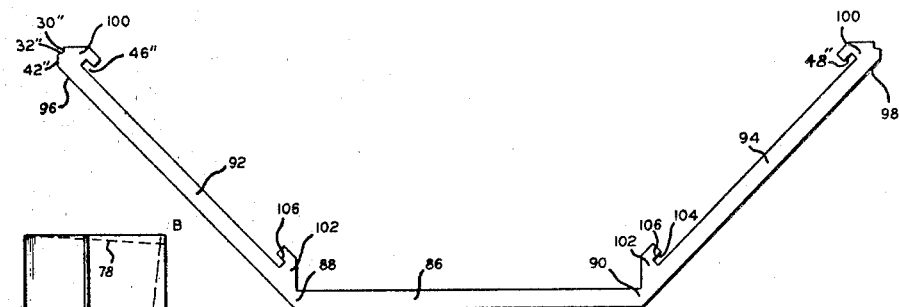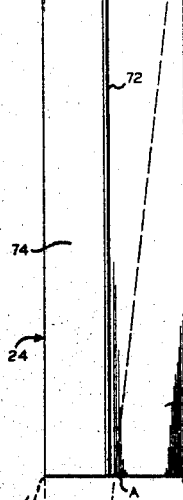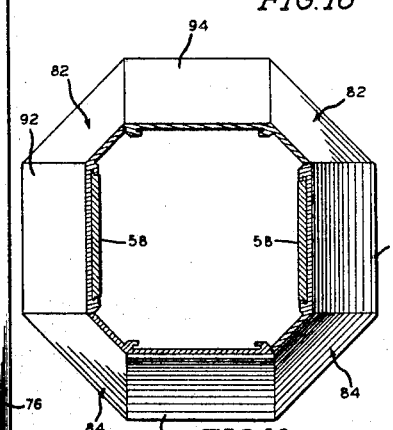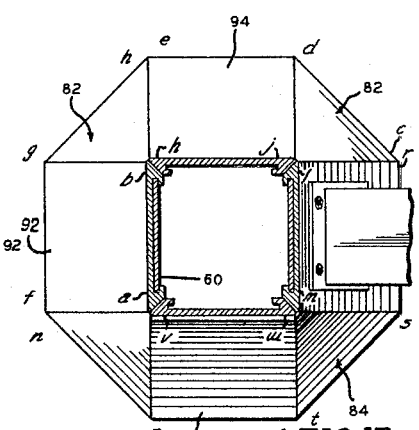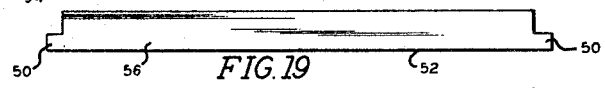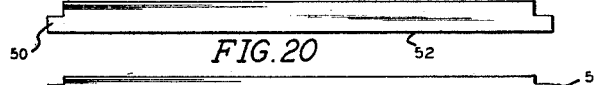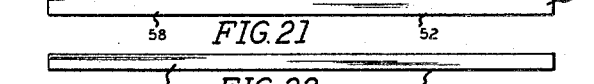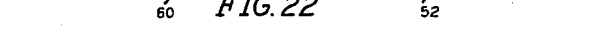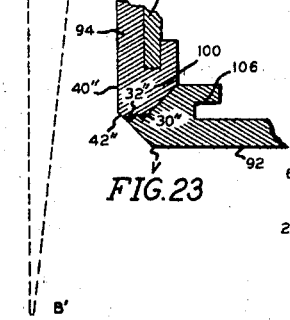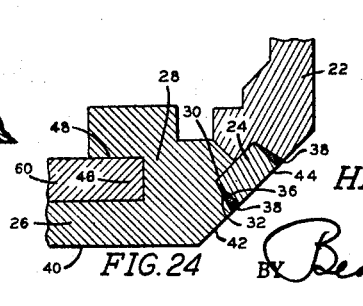

United States Patent Office 3,263,302
Patented August 2, 1966

3,263,302
METHOD OF MAKING A TAPERED STRUCTURAL MEMBER
Harold E. Handley, Jackson, Mich., assignor to McGraw-Edison Company, Elgin, Ill., a corporation of Delaware
Original application Mar. 23, 1961, Ser. No. 97,868, now Patent No. 3,196,990, dated July 27, 1965. Divided and this application May 7, 1965, Ser. No. 454,083
3 Claims. (Cl. 29—155)

The invention pertains to tapered structural members and the method of making the same, and particularly relates to such structural members constructed of aluminum. This application is a division of United States application, Serial No. 97,868, filed March 23, 1961, now Patent 3,196,990 issued July 27, 1965.

An object of the invention is to provide an aluminum tapered structural member which is suitable for use as a pole or vertical support for electric power transmission lines, street lights and the like where a strong, attractive structural member is desired. In the erection of towers or supports for high-tension lines in residential or heavily populated areas, it is undesirable that the conventional wide base tower be employed, and the structural member of the invention is capable of supporting heavy high-tension lines the required height while occupying a relatively small base area.

The fabrication of structural pole members of steel is known and such steel members often are of a tapered configuration. However, steel structural members are heavy and, thus, expensive to transport and also require relatively frequent maintenance to resist rusting and corrosion. In the construction of such members of aluminum, the weight and maintenance difficulties are very significantly reduced. However, with conventional fabrication techniques the higher cost of aluminum and the problems encountered in the welding thereof have deterred usage of this type of structure.

The invention contemplates a method of making the same wherein tapered aluminum structural members can be made of considerable length and yet meet the desired strength and cost requirements. In accordance with the invention, the structural member is so fabricated that a minimum of material is employed to achieve the desired stress resistance, thereby reducing the aluminum necessary for a given application and, hence, making it possible to form an aluminum structural member at a cost comparable to a similar member of steel.

Another object of the invention is to provide a method of making an aluminum structural member of considerable length wherein means are provided for varying the section modulus over the length of the member to obtain an efficient weight-strength relationship.

A further object of the invention is to provide a method of making a tapered structural member having uniformly sized and shaped surfaces thereon extending throughout the length thereof for the attachment of load-carrying elements, and wherein the structural member is particularly strengthened and reinforced in the direction of major loads imposed thereon.

Another object of the invention is to provide a method of making a tapered structural member having a plurality of surfaces formed thereon of uniform width throughout the length and wherein the member is constructed of a plurality of planar components.

Another object of the invention is to provide a method of making aluminum tapered structural members formed of extruded planar components wherein irregularly shaped components can be constructed from the extrusions with a minimum of fabrication, shaping, and scrap.

Another object of the invention is to provide a method of making an aluminum structural member having a plurality of welded seams wherein an extra mass of aluminum is provided adjacent the welded areas to carry away welding heat and minimize the possibility of burning the material. Also, the components adjacent the welded seams are so shaped as to provide a combination of butt and lap-welding, and locating surfaces are formed upon the components to locate the components prior to the welding.

Yet a further object of the invention is to provide a method of making a tapered aluminum structural member formed of an extrusion having three planar surfaces whereupon the cutting of two equal extrusions into halves permits the assembly of a structural member having an octagonal configuration at the base and a substantially rectangular configuration at the top.

These and other objects of the invention arising from the details and relationships of the components and embodiments thereof will be apparent from the following description and accompanying drawings wherein:

FIGS. 1 and 2 are elevational views having an angular relationship of 45° of an embodiment constructed in accordance with the method of the invention, FIGS. 3, 4, and 5 are plan, sectional views taken along sections III—III, IV—IV and V—V, respectively, of FIG. 1, FIG. 6 is an elevational end view of a heavy chord extrusion as employed in a structural member of the invention, FIG. 7 is an elevational end view of a mediumweight chord as employed with the invention, FIG. 8 is an elevational end view of a lightweight chord as employed with the invention, FIG. 9 is a plan view of the lightweight chord extrusion shown in full lines prior to the cutting operation, the dotted lines showing the final welded configuration, FIG. 10 is a detail, sectional view of the welded junction of a shaped flange and a lightweight chord, FIGS. 11 and 12 are elevational views having an angular relationship of 45° of another embodiment of the invention, FIGS. 13 and 14 are plan views of two extrusions of the configuration shown in FIG. 18 prior to severing into halves in accordance with the method of the invention, FIGS. 15, 16 and 17 are plan, sectional views taken along sections XV—XV, XVI—XVI, respectively, of FIG. 11, FIG. 8 is an enlarged scale, elevational, end view of the extrusion employed with the embodiment of FIGS. 11 and 12, FIGS. 19 through 22 are end views of various weights of inserts which may be employed with the embodiments of FIGS. 1 and 2 and FIGS. 11 and 12, FIG. 23 is a detail, sectional view of the upper junction of the uniform width portions of the extrusion as occurring in FIG. 17, and FIG. 24 is a detail, enlarged, sectional view of the upper junction of the chord components as shown in FIG. 5.

The general appearance of the structural member embodiment of FIGS. 1 through 10 constructed in accordance with the method of the invention will be apparent from FIGS. 1 and 2, wherein the structural member is indicated by the reference 10 on which is mounted a support arm 12 by bolts or suitable fasteners. The support arm 12 may be employed to support a plurality of insulators and a conductor 14, as shown, or a street light or other apparatus may be attached to the support arm. FIG. 2 illustrates the appearance of the structural member 10 from a vantage point angularly related 45° from that of FIG. 1, and it will be appreciated that the structural member 10 consists of a plurality of planar chord components 16 of uniform width and chord components 18 which are of triangular configuration and are interposed between the components 16. For purposes of illustration and description, the relationship between the width and height of the structural member is exaggerated and, hence, the illustrated structural member has a more pronounced tapered configuration than usually employed in actual practice. For instance, components 16 may be of a width of approximately nine inches and a length of 40 feet or better and, hence, the tapered configuration would not be as pronounced as illustrated.

The structural member 10 is preferably constructed of three extruded chord components or portions of generally planar configuration having the cross sections shown in FIGS. 6 through 8. The heavyweight chords 20, as used in the preferred construction, are located in diametrically opposed relation with respect to the axis of the structural member. The medium weight chord members 22 are disposed at right angles to the chords 20 and are, likewise, diametrically opposed with respect to each other. The relationship will be fully apparent from FIG. 3. The lighter weight chord portions 24 formed in a substantially triangular configuration, as will be later explained, are interposed between the longitudinal edges of the adjacent chord portions 20 and 22. By welding the chords 24 to the longitudinal edges of the chords 20 and 22, an integral tapered configuration is produced.

In the desired configuration, the width of the chords 20 and 22 and base of chords 24 are equal whereby the base portion of the structural member 10 is of a regular octagonal configuration, FIG. 3, and as the chord portions 24 substantially define an apex at the top of the structural member, the configuration of the member 10 at the top will be substantially that of a square, as shown in FIG. 5. Intermediate the structural member bottom and top portions a section as shown in FIG. 4 will occur. In that chord portions 20 are of equal width throughout their entire length, adequate surface will be available for mounting support arms 12 or other support structure.

The construction of the heavy chords 20 is best shown in FIG. 6 wherein the chord is illustrated as having a planar body portion 26 and having a pair of longitudinal edges on which are defined flange portions 28 which extend in a perpendicular direction to the plane of the body portion 26 and are parallel to each other throughout the length of the chord. The flanges 28 serve as both means for locating the chord components welded thereto and as means for maintaining the inserts in position, as later described. The flange 28 is provided with a locating surface 30 which extends in a longitudinal direction and is angularly related 45° from the plane of the body portion 26. Surface 30 intersects a planar surface 32 which abruptly rises therefrom and, likewise, extends the length of the chord. Surface 32 defines an included angle with surface 30 slightly greater than 90° whereby a V-groove is defined with the end 36 of chord 24 to receive the weld fillet which extends substantially the entire depth of the groove. It will be appreciated that the squared end 36 rests upon the surface 30 and the end abuts the surface 32 adjacent the intersection with surface 30, thereby accurately positioning the chord 24 relative to the chord 20. Thereupon, the chords 20 and 24 may be welded together by the longitudinally extended weld fillet 38.

A feature of the arrangement of surface 32 and the outer chord surface 40 lies in the fact that the surface 34 does not intersect the surface 40 but, rather, terminates short thereof, whereby an intermediate surface 42 is formed on the chord 20. Thus, upon assembly, the extension of the outer surface 44 of chord 24 coincides with the planar surface 42 and the intersection of the outer surface 44 and outer surface 40 is the line defined by the intersection of the outer surface 40 and surface 42. This construction permits the exterior "corners" of the structural member 10 to be accurately defined on a structural chord member having flanges thereon and results in a better appearance than structures wherein the corner occur in the weld material itself. After the welding of the chords, the welds are preferably ground flush to the surfaces 42 and 44, whereby a uniform and attractive appearance is obtained.

An important feature of the invention lies in the fact that the wall thickness of the flange 28 is greater than the wall thickness of the rest of the chord 20, whereby this increased mass of material adjacent the weld functions to rapidly carry away the heat of the weld from the weld location and minimizes the possibility of burning the aluminum material. The rapid heat conductivity characteristics of aluminum are well-known, and it has been found that by employing the greater wall thickness in the mass of material adjacent the weld area, that the welding of the structural members is significantly simplified and better results are obtained than where the increased wall thickness and mass is not employed.

Another of the features of the structural member and chords of the invention lies in the ability to vary the section modulus and strength characteristics of the structural member as desired and, to this end, the flanges 28 are formed with a longitudinally extending recess 46 defining a shoulder 48 in spaced parallel relation to the planar portion 26 of chord 20. The recesses 46 are in opposed facing relation to each other and may receive an elongated insert of a cross-sectional configuration as shown in FIGS. 19 through 22. The inserts of FIGS. 19 through 21 are provided with a longitudinally extending notch which defines a tongue 50 on each longitudinal edge of the insert which is closely received in a recess, and the surface 52 of the insert will, thus, be substantially held in engagement with the inner surface 54 of the chord portion 26. The lightest weight 60, as shown in FIG. 22, is of a thickness equal to that of the distance between shoulder 48 and surface 54 and is of a uniform wall thickness.

The inserts are inserted in the recesses 46, as desired, to strengthen the structural member in the most effective manner. As shown in FIG. 1 by the dotted lines 62 and 64 indicating the ends of inserts, three inserts may be employed of substantially equal length, the heaviest insert 56 being employed adjacent the bottom of the structure, a lightweight insert 60 being employed at the top of the structural member, and an intermediate weight insert 58 being employed in the intermediate portion of the structural member. After the inserts are located in end-to-end relation along the longitudinal length of the structural member, the inserts are welded to the flanges 28 to thereby increase the effective section modulus and cross section of the associated chord. As the support arms 12 and other weight-bearing members are mounted upon one or both of the chords 20, the primary stresses within the structure will occur within the chords 20 and, thus, by reinforcing those components of the structural member which are subjected to the primary stress forces, a most efficient distribution of the material of the structural member is achieved. Likewise, the employment of various weights of inserts throughout the length of the structural member produces an efficient weight distribution in a simplified manner.

The chord members 22 are of slightly lighter weight than chord members 20 and are provided with longitudinally extending rib portions 66 on the inner surfaces thereof for reinforcement purposes. The chord members 22 are provided with flange members 68, FIG. 7, which do not have recesses defined thereon. However, the flange members 68 are of greater wall thickness than the planar portion of the chord body and are provided with locating surfaces 30', 32' and 42' which function as the similar surface described with regard to chord 20. With the supporting arms 12 being attached to the chords 20, chords 22 are not subject to the degree of stress placed upon chords 20 and, in most applications, the lighter weight chords 22 are acceptable and provide the necessary strength characteristics. It will be appreciated that in a heavy duty application, the chords 22 would be replaced by another pair of chords 20 which would be reinforced with inserts and, thus, a structural member may be readily assembled and fabricated to meet the particular strength requirements of each application. Likewise, a structural member employing only chords 22 may meet the strength requirements for lightweight application.

While the substantially triangularly shaped chords 24 may be formed from any type of aluminum plate, it is preferred that this component be constructed of an extruded member having the sectional configuration shown in FIG. 8 wherein the extrusion is of a primary planar body portion 70 having a longitudinally extending reinforcing rib 72 formed thereon. It will be noted that the rib 72 is slightly off center for a reason which will be later apparent. The preferred construction of the triangular chord 24 is described in conjunction with FIG. 9 wherein a rectangularly shaped extrusion of the section shown in FIG. 8 is illustrated. The extrusion of FIG. 9 is only half the length of the structural member 10 employing the finished triangular chord 24. The extrusion is prepared for use with the invention by severing, with a saw or other means, the extrusion from the point A to the point adjacent the corner indicated by B wherein the extrusion is now in the form of a truncated portion 74 and a substantially triangular portion 76 having an apex b. The triangular portion 76 is then, in effect, hinged about the point A wherein the corner C is now located as shown by C'. This relationship places the apex B as indicated by dotted lines and now the longitudinal edges of the original extrusion are in alignment and the severed edges of the extrusion are likewise aligned. Upon welding the portion 74 to 76 at the junction A, C' the chord 24 is produced. With a relatively short structural member, it is desirable to remove a small portion of the base of the chord 24 by cutting along the dotted line 78. However, in structural members of considerable length, this operation is not necessary due to the small deviation from an isoceles triangle. By placing the rib 72 slightly off center, it will be appreciated that in severing the extrusion from A to B it is not necessary to pass through the rib.

Another embodiment of the structural member employing the method of the invention is described in conjunction with FIGS. 11 through 18 and 23. This embodiment has an exterior appearance similar to that of the embodiment of FIGS. 1 and 2 and employs many of the concepts thereof. However, the embodiment of FIGS. 11 and 12 requires only half the welding operations of member 10 for a structural member of similar configuration and length. The invention, in accordance with FIGS. 11 and 12, likewise pertains to a structural member 80 of octagonal base sectional configuration and a rectangular top portion. However, this embodiment is fabricated from two aluminum extrusions having a cross section as shown in FIG. 18 and a length equal to that of the structural member to be fabricated. To construct the member 80 two extruded members 82 and 84 of the sectional configuration of FIG. 18 are required as shown in FIGS. 13 and 14 wherein the extruded members are shown as viewed from the top with relation to FIG. 18. From FIG. 18 it will be appreciated that the extrusions 82 and 84 consist of a central planar portion 86 having longitudinal edge portions 88 and 90, and planar side portions 92 and 94 are formed integral with the central portion having outer longitudinal edges 96 and 98, respectively. The longitudinal inner edges of portions 92 and 94 are common with the longitudinal edges 88 and 90 of the central portion 86. In that the structure to be fabricated is to have an octagonal base configuration, the side portions 92 and 94 define an included angle of 135° with the central portion, and as the longitudinal edges of the central and side portions are parallel, the extrusion, in effect, defines three separate rectangular planar areas. The outer longitudinal edges 96 and 98 of the side portions are formed with a flange 100 on which surfaces 30", 32", 42" and 48", are defined in a relationship similar to the equivalent surfaces illustrated in FIG. 10 with the embodiment of FIGS. 1 and 2 and function in the same manner as described above as will be later apparent. A longitudinally extending projection 102 is defined adjacent the longitudinal edges 88 and 90 of the side portions 92 and 94 to define the recess 104 and shoulder 106, whereby an insert of a type shown in FIGS. 19 through 22 may be received between the recesses 46" and 104 and used in the manner described in conjunction with the embodiment of FIGS. 1 and 2 to reinforce the structural member 80 as desired.

Referring to FIGS. 13 through 17, the fabrication of the member 80 will be described. For purposes of description, the longitudinal edges of the portions 86, 92 and 94 are indicated by letters, the longitudinal edges of one end of the extrusion 82 being designated by the letters $a$, $b$–$c$, $d$, and $e$, and the other end of the extrusion employing letters $f$, $g$, $h$–$j$, and $k$ to designate the opposite end of the longitudinal edges. It will be appreciated that the edges $a$–$f$ and $e$–$k$ are the outer edges 96 and 98 of the side portion 92 upon which the flanges 100 are defined. In a like manner, the extrusion 84 of FIG. 14 has longitudinal edges designated by letters $l$, $m$–$n$, $p$, and $q$ at one end and letters $r$, $s$, $t$–$v$ and $w$ at the other end. The extrusion 82 is severed in its central portion 86 in a diagonal manner from substantially the point $h$–$j$ of one longitudinal edge to the point $b$–$c$ of the other longitudinal edge, thereby producing two truncated halves, one of which is defined by the letters $a$, $b$, $h$, $g$, and $f$ and the other by the letters $c$, $d$, $e$–$k$, and $j$. In a like manner, the extrusion 84 is diagonally severed in its planar region 86 to define truncated halves $l$, $m$, $t$, $s$, $r$ and $n$, $p$, $q$, $w$, and $v$. By reversing one of the halves of each of the extrusions, the wide end of the extrusions may be placed together, whereby the severed edge of one half engages the surfaces 30" and 32" of the flange of the adjacent half to define the octagonal configuration as shown in FIG. 15. By diagonally severing the central region 86, the structural member 80 will have a tapered configuration throughout its length and the top portion of the structural member will be rectangular in form as shown in FIG. 17. It will be noted that as the side portions 92 and 99 of the extrusions are not severed the side portions will extend entire length of the structural member in a uniform width to form the rectangular configuration at the top. The support arms 108 will be fixed to the side portions by bolts or other fastening means and inserts may be received within the recesses of the flanges 100 and projections 102 and welded to the flange and projection to strengthen the structural member as desired. FIG. 23 shows in detail the structural arrangement of the intersection of the side portions at the top of the member 80 where the side portions of the extrusion halves are contiguous.

The embodiment of FIGS. 11 and 12 has the advantage of requiring only four weld fillets which extend the length of the structural member in contrast to the eight longitudinal welds with the embodiment of FIGS. 1 and 2. Hence, less labor is involved during fabrication.

While the invention is particularly adaptable for use with aluminum components, it will be appreciated that some of the concepts may be employed with steel or other structural material. It will also be appreciated that while the components employed in the practice of the invention are illustrated as being of a width wherein the bottom of the structural member is of an octagonal configuration having sides of substantially equal width, the inventive concepts may be practiced wherein the triangular chord portions are of less width at their base than the uniform width chord. An important advantage of the fabricating processes described results from the fact that while aluminum extrusions are employed to provide the components, the extrusions may be severed in such a manner that the only waste material resulting is that removed by saw teeth. Thus, the invention has the advantage of utilizing substantially all the material purchased by the fabricator. By the use of the inserts, the applicant is able to readily custom design the structural members for their particular application while employing standard components and, therefore, provide an efficiency in the use of the material which is heretofore unknown with this type of structural member.

It is appreciated that various embodiments, other than those described, may be apparent to those skilled in the art without departing from the spirit and scope of the invention, and it is intended that the invention be defined only by the following claims.

I claim:

1. The method of fabricating a hollow, tapered elongated structural member of octagonal configuration at one end and a substantially square configuration at the other end from an elongated member comprising three parallel elongated rectangular planar portions, said portions including a central portion having parallel longitudinal edges and side portions having longitudinal parallel edges, one edge of each of said side portions being affixed to a longitudinal edge of said central portion whereby said side portions are angularly disposed on a common side of the plane of said central portion 45° therefrom, comprising the steps of diagonally severing the central portion of two of said elongated members of equal length longitudinally from the intersection of one longitudinal edge and one end thereof to the intersection of the other longitudinal edge and other end thereof to form two halves from each of said elongated members, each of said halves being of a base width at one end substantially equal to the width of one of said side portions plus the width of the central portion and of a top width at the other end substantially equal to the width of one of said side portions, placing said halves such that said halves longitudinally extending edges adjacent said base widths are in engaging relationship defining an octagon and said top widths substantially define a rectangle and welding the engaging longitudinally extending edges of said halves.

2. The method of fabricating a hollow, elongated structural member of uniform tapered configuration throughout its length having an exterior surface formed of surface portions of uniform and tapered width alternately disposed and having first and second ends comprising the steps of forming a plurality of extruded, identical, elongated members having ends and a longitudinal length equal to that of the structural member to be formed, said members each including a central rectangular portion having parallel longitudinal edges and rectangular side portions having parallel longitudinal edges, a longitudinal edge of each side portion being affixed to a longitudinal edge of the associated central portion and the other longitudinal side portion edge forming a free edge, said side portions being equally angularly related to the general plane of the associated central portion on a common side thereof, obliquely severing said members' central portion longitudinally from end-to-end to form a plurality of identical member halves each having a side portion free edge, a central portion free edge, a wide end and a narrow end, relating said member halves to each other such that each member half central portion free edge engages a member half side portion free edge to form a composite hollow member, said member halves wide ends and narrow ends being disposed at common ends, respectively, of said composite member, and affixing said engaging free edges together to form a hollow, tapered structural member having a first end peripheral configuration formed of said halves wide ends and a second end peripheral configuration formed of said halves narrow ends.

3. The method of fabricating a hollow structural member as in claim 2 wherein each of said members' central portion is diagonally severed from a point adjacent the intersection of a member end and a central portion longitudinal edge to a point adjacent the intersection of the member other end and the central portion other longitudinal edge whereby the configuration of said first end of said structural member is defined by the ends of alternately disposed central and side portions and said structural member second end is defined by the ends of said side portions.

References Cited by the Examiner
UNITED STATES PATENTS

| | | | |
|---|---|---|---|
| 466,012 | 12/1891 | Seaman | 29—155 X |
| 999,267 | 8/1911 | Slick | 29—463 |
| 1,498,176 | 6/1924 | Lachman | 189—23 |
| 1,594,658 | 8/1926 | Bushong | 189—23 |
| 2,808,135 | 10/1957 | Moran | 29—155 X |
| 2,825,431 | 3/1958 | Molt | 29—155 X |

JOHN F. CAMPBELL, *Primary Examiner.*

THOMAS H. EAGER, *Examiner.*